United States Patent [19]

Herald

[11] Patent Number: 5,672,102
[45] Date of Patent: Sep. 30, 1997

[54] DUST REDUCTION SYSTEM FOR ELECTRONIC ENCLOSURES

[75] Inventor: Stephen D. Herald, Huntsville, Ala.

[73] Assignee: Toshiba America Information Systems, Inc., Irvine, Calif.

[21] Appl. No.: 701,129

[22] Filed: Aug. 21, 1996

[51] Int. Cl.[6] .................................................. H05K 7/20
[52] U.S. Cl. ........................... 454/184; 55/385.4; 55/434; 361/695
[58] Field of Search .................. 454/184; 361/695; 55/434, 385.2, 385.4, 467

[56] References Cited

U.S. PATENT DOCUMENTS

| | | | |
|---|---|---|---|
| 5,210,680 | 5/1993 | Scheibler | 361/695 |
| 5,493,473 | 2/1996 | Yanagi | 361/695 |
| 5,559,673 | 9/1996 | Gagnon et al. | 454/184 X |

*Primary Examiner*—Harold Joyce
*Attorney, Agent, or Firm*—Banner & Witcoff, Ltd.

[57] ABSTRACT

A dust reduction system for electronic enclosures which utilizes several techniques to eliminate, or minimize, the dust in the air stream that ventilates an electronic enclosure. More specifically, the system includes (1) multiple small holes in panels of the enclosure, (2) placement of the multiple holes in the lower portion of side panels, (3) expansion chambers downstream of the multiple holes that act as potential dust collectors or traps, and (4) routing the air flow to effect changes of direction so as to create pockets of low velocity.

4 Claims, 7 Drawing Sheets

DUST REDUCTION SYSTEM FOR ELECTRONIC ENCLOSURES

FIELD OF THE INVENTION

The present invention relates to a dust reduction system for electronic enclosures. More specifically, the present invention relates to a passive dust reduction system which utilizes several techniques to eliminate, or minimize, the dust in the air stream that ventilates an electronic enclosure. Even more specifically, the present invention relates to: (1) multiple small holes in panels of the enclosure, (2) placement of the multiple holes in the lower portion of side panels, (3) expansion chambers downstream of the multiple holes that act as potential dust collectors or traps, and (4) routing the air flow to effect changes of direction so as to create pockets of low velocity.

BACKGROUND OF THE INVENTION

Excessive dust inside electronic enclosures can interfere with the operation of the electronic device or even cause the electronic components to fail. Furthermore, electronic enclosures can not be sealed to keep out the dust, as such an arrangement would cause the electronic components to fail due to overheating. In many known arrangements, a continuous flow of ventilating air is circulated through the electronic enclosure to cool the electronic components. However, this continuous air stream will bring in dust from the surrounding environment, unless measures are taken to clean the stream. Removing dust from the intake air stream is especially important when the electronic enclosure rests on the floor where dust particles are prone to accumulate. Dust removal becomes imperative when the air intake port is adjacent the floor. Many existing arrangements are unsatisfactory in this regard.

A variety of references disclose dust reduction systems for electronic enclosures. Dust reduction systems can be broken into two main categories: active dust reduction systems and passive dust reduction systems. Active dust reduction systems generally use removable filters to catch and trap the dust in a stream of air. These filters are meant to positively retain any dust taken from the airstream. However, these arrangements, may be undesirable in some circumstances because they tend to become clogged over time, which increases the resistance to the intake air flow. Therefore, these filters must be monitored and periodically cleaned or replaced. Failure to clean these filters could result in electronic component failure due to overheating due to reduce air flow.

For instance, U.S. Pat. No. 1,548,839 to Henshall discloses an active air filter that may be installed in the fresh air intake of a ventilating unit to exclude the dust, dirt and foreign matter being drawn into the ventilating unit. Henshall discloses (1) a wire mesh screen at the opening in the enclosure, (2) a wall box directly downstream of the wire mesh screen, (3) a series of louvers positioned across the path of the air flow in the wall box, (4) a filter having a stack of baffle plates, each plate composed of four sections, each section having an array of small apertures, the apertures getting progressively smaller as the air flows across the filter, (5) a coating of oil on each baffle plate to retain any dust particles, and (6) a filter geometry such that the air flow is forced to change direction as it passes through the filter. Henshall's system is an active filtering system. Henshall's baffle plates trap and retain dust particles with the coating of oil and, therefore, need to be removed for periodic cleaning.

In contrast, passive dust reduction systems do not use filters that need to be cleaned or replaced. These systems generally rely on changes in the velocity of the air stream to allow dust to settle out. For instance, U.S. Pat. No. 4,659,349 to Rodi et al. discloses a labyrinth-type "filter" to remove dust and impurities from the intake ventilating air flow for electronic systems. This labyrinth-type filter is a series a chambers wherein the air stream changes directions as it travels through the chambers. When the air flow velocity drops, dust particles fall out of the air stream. Rodi discloses a single air intake opening in the form of a long slot. The large air inlet cross section of Rodi, although it ensures a sufficient supply of cooling air, is also more likely to let large clumps of dust enter with the ventilating air stream.

Additionally, many systems address the ventilation of electronic enclosures for purposes of heat transfer. These systems generally have slotted air intake apertures or apertures with several relatively small holes in the panels of the enclosure to keep the largest clumps of detritus from entering the enclosure. For instance, U.S. Pat. No. 5,406,316 to Schwiebert et al. discloses an airflow system for an ink-jet printer. One embodiment shows ventilating air entering the printer's enclosure through multiple small apertures in the lower portion of the front panel. The entering air is then shown immediately passing over a circuit board, where any particles not stopped by the multiple small openings in the panel of the enclosure could immediately be deposited on the electronic components. Similarly, U.S. Pat. No. 4,702,154 to Dodson, discloses a retrofit power supply and fan unit to achieve lower operating temperatures in personal computers. Intake air is drawn through a double row of small holes in the housing. After entering the holes, the intake air immediately enters the circuit board enclosure without any further attempt to reduce the dust in the air stream.

The present invention overcomes the disadvantages of the prior an by providing art electronic enclosure with several passive defenses to the entry of dust into the electronic component housing region of the enclosure. Thus, dust will be removed from the intake air stream without the danger of clogged filters reducing the flow of air to the electronic components.

SUMMARY OF THE INVENTION

The purpose of this invention is to prevent excessive dust from entering the central electronic cavity of a PC/electronic enclosure. The Dust Reduction System is composed of (1) multiple small holes arrayed along the lower regions of side panels, (2) expansion chambers directly downstream of the array of small holes, and (3) intake air channels that force the air stream to change direction thereby creating small pockets of low velocity air. The Dust Reduction System removes dust from the intake ventilating air before the air reaches the electronic enclosure's main cavity. In the preferred embodiment, intake ventilating air is pulled in through arrays of multiple small holes located in opposing side skirts, where it then enters an open area, or expansion chamber, behind each side skirt. From there, the air stream is routed into a plenum chamber behind the lower front skirt, and thence up into the central enclosure where the electronic components are housed. The multiple small holes serve to keep out the largest particles of dust. The expansion chambers behind the side skirts serve to reduce the velocity of the air flow and allow more dust to fall out of the air stream. Furthermore, the routing and redirecting of the air flow from the expansion chambers to the plenum chamber also serves to reduce the velocity of the air flow in select areas and thus, allows even more dust to fall out of the air stream. From the plenum chamber behind the front skirt, the air flows up into the central electronic component housing of the enclosure to cool the electronic components. Finally, the ventilating air stream is exhausted to the atmosphere through the lower back panel vents.

In view of the foregoing, it is a principal object of the present invention to provide an electronic enclosure with clean ventilating air.

More specifically, it is an object of the present invention to provide an electronic enclosure with a passive dust reduction system, i.e., a dust reduction system that does not need constant monitoring or filter maintenance.

Even more specifically, it is an object of the present invention to provide a passive dust reduction system that will reduce the amount of dust in a ventilating air stream without using active filters that can become clogged with dust particles causing a partial or total blockage of the ventilating air stream.

It is another object of the present invention to cause dust to fall out of a stream of ventilating air by subjecting the ventilating air stream to a series of passive filtering devices.

It is a final object of the present invention of provide a personal computer electronic enclosure with a partially redundant dust reduction system whereby if one air inlet becomes blocked, the other air inlet will ensure that the electronic components are adequately ventilated.

BRIEF DESCRIPTION OF THE DRAWINGS

FIG. 4 4a, 4b and 4c are top plan, side elevational, and bottom plan views of the side skirts with array of holes in the preferred configuration.

DETAILED DESCRIPTION OF INVENTION

Figure 1:
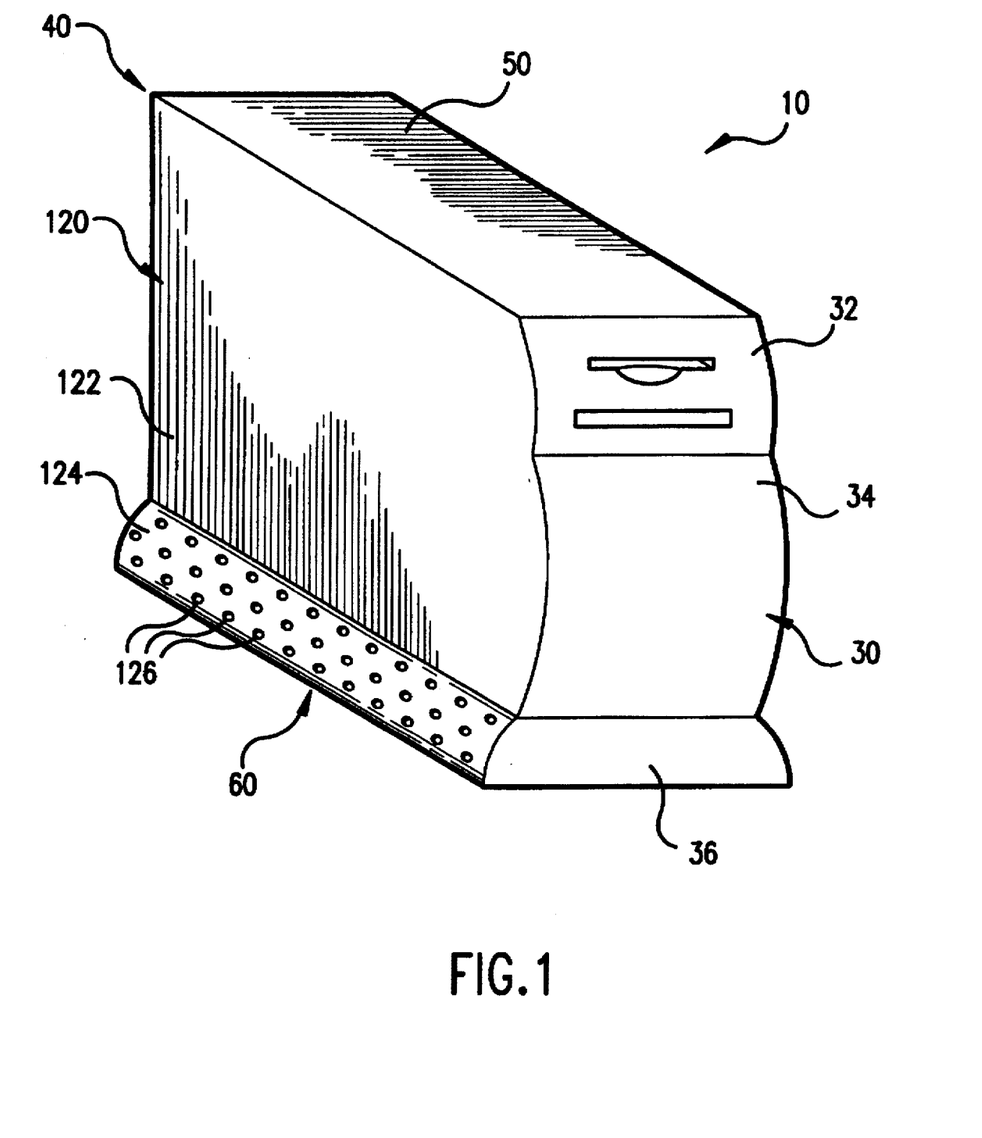
FIG. 1 is a front perspective view of the present invention in its preferred embodiment configuration.
Figure 2:
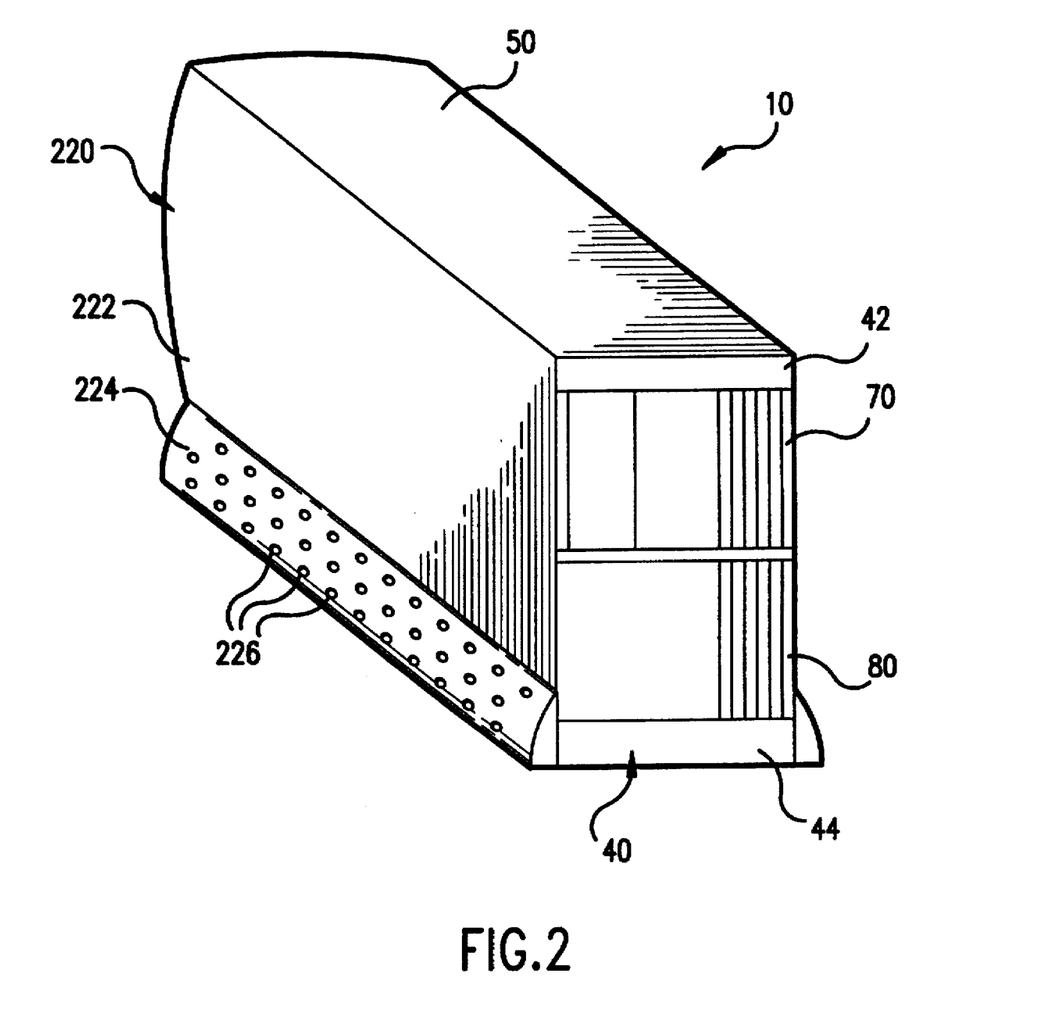
FIG. 2 is a rear perspective view of the present invention in its preferred embodiment configuration.

Referring to the figures, the electronic enclosure embodying the present invention is generally designated by reference numeral 10. As depicted in FIGS. 1 and 2, the electronic enclosure 10 generally consists of opposed side panels 120 and 220, a front panel 30, a back panel 40, a top panel 50, a bottom panel 60, an air intake port 70, and air outlet port 80. In the preferred embodiment shown in FIGS. 1 and 2, many of the panels are shown as having one or more separate replaceable pieces, each piece corresponding to a section. Side panels 120 and 220 are each illustrated as having two sections, primary side sections 122 and 222 and side skirts 124 and 224 below the primary side sections 122 and 222. Front panel 30 is shown as having three sections, an upper front section 32, a central front section 34, and a front skirt 36. Back panel 40 is illustrated as having two sections, an upper back section 42, and a lower back section 44. The number of panels or the number of sections of each panel may be varied, and the electronic enclosure would still fall within the scope of the present invention. These modular panels are typically formed of injection molded plastic and are easily replaced to correspond to any new electronic device configuration.

Figure 3:
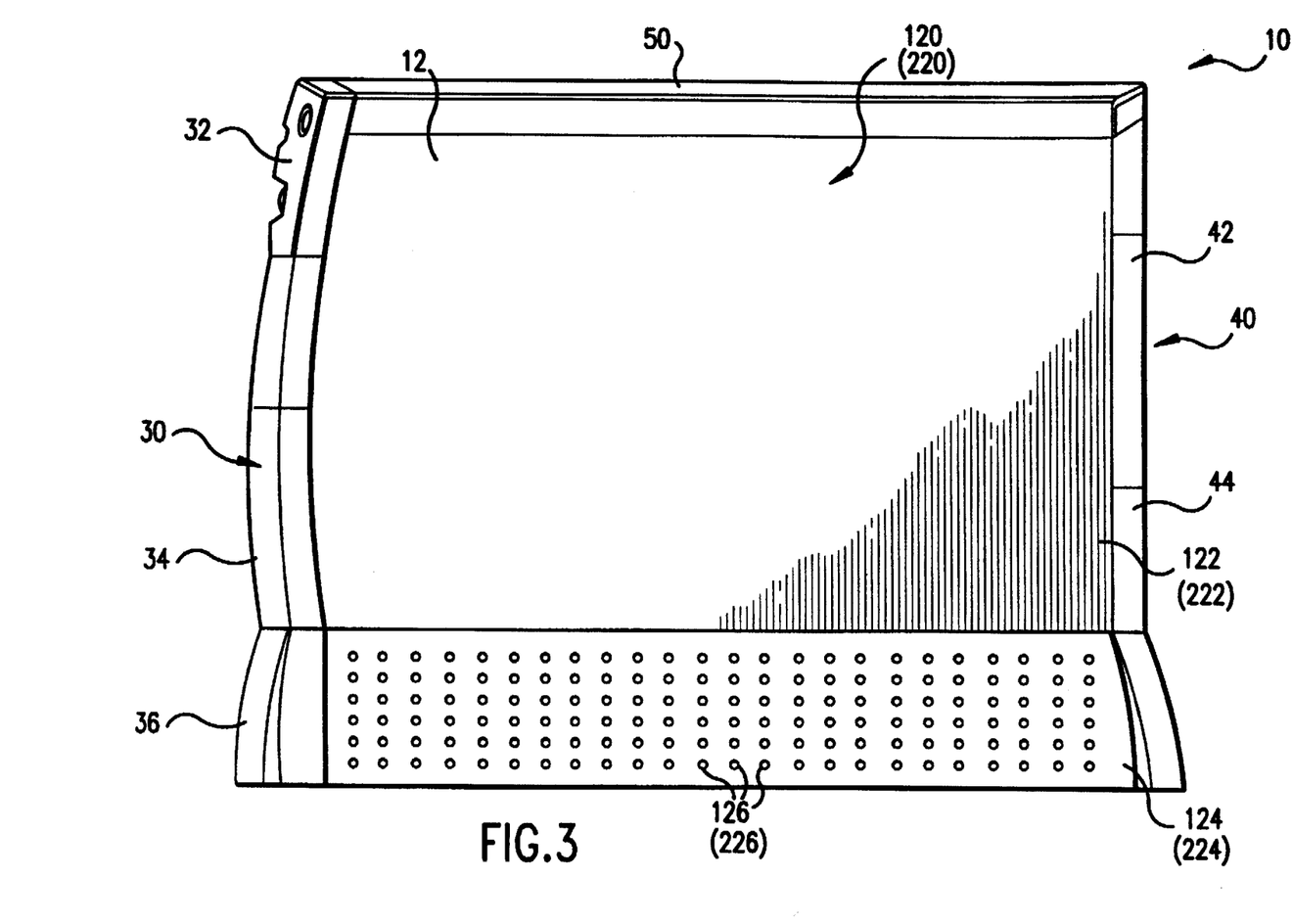
FIG. 3 is an elevation view of the side panels.
Figure 4A:
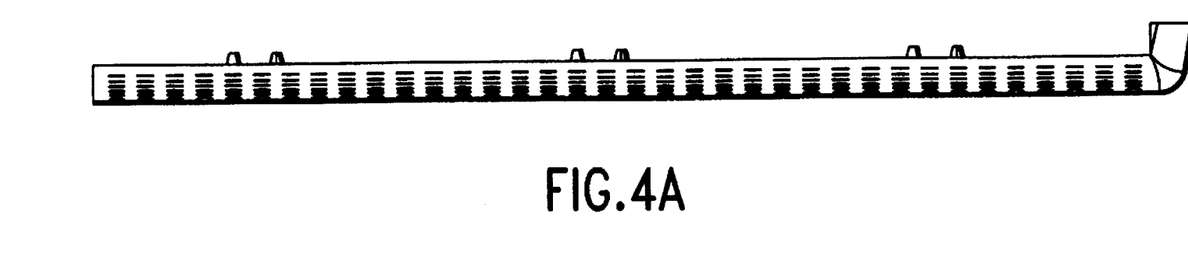
Figure 4B:
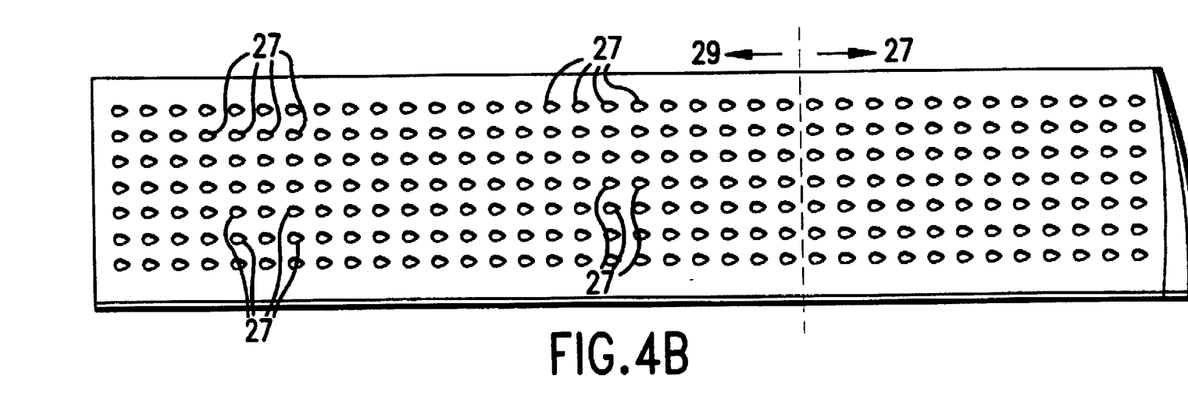
Figure 4C:
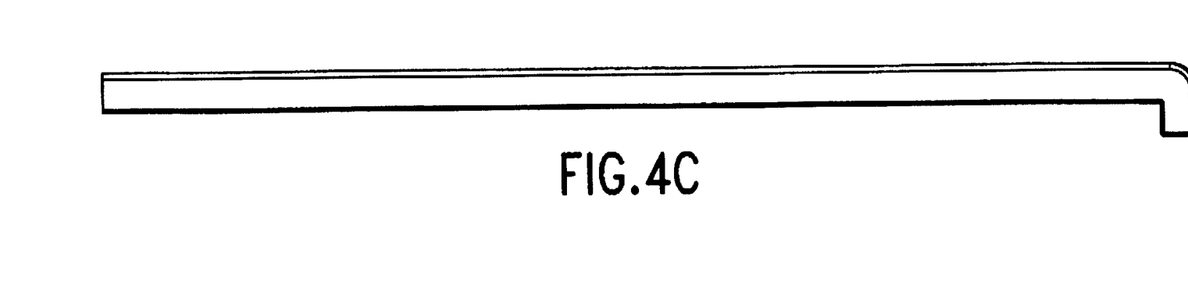

In FIG. 3, side skirts 124 and 224 are each shown with an array of multiple small holes 126 and 226. The preferred embodiment is shown in FIG. 4. Each array of holes consists of 173 holes arranged in 24 columns and 7 rows. Note that 15 blind holes 27 are interspersed among the through holes 29 in the array. The through holes 29 are 0.125 inches in diameter. Further, note that in the preferred embodiment the holes in the back portion of the side skirts are blind holes 27. Generally, the number, placement and exact size of the small holes in the side skirts 124 and 224 can be varied. Further, it is recognized that the characteristics of the array of holes in side skirts 124 and 224 would be specified and optimized by one skilled in the art to accommodate various design parameters, such as, the amount of cooling air required, cooling fan capacity, and the pressure drops in the system. For instance, the number of holes may be varied, the size of the holes may be varied and, furthermore, the size of the holes need not be constant, and the overall flow area may be increased or decreased.

Figure 5:
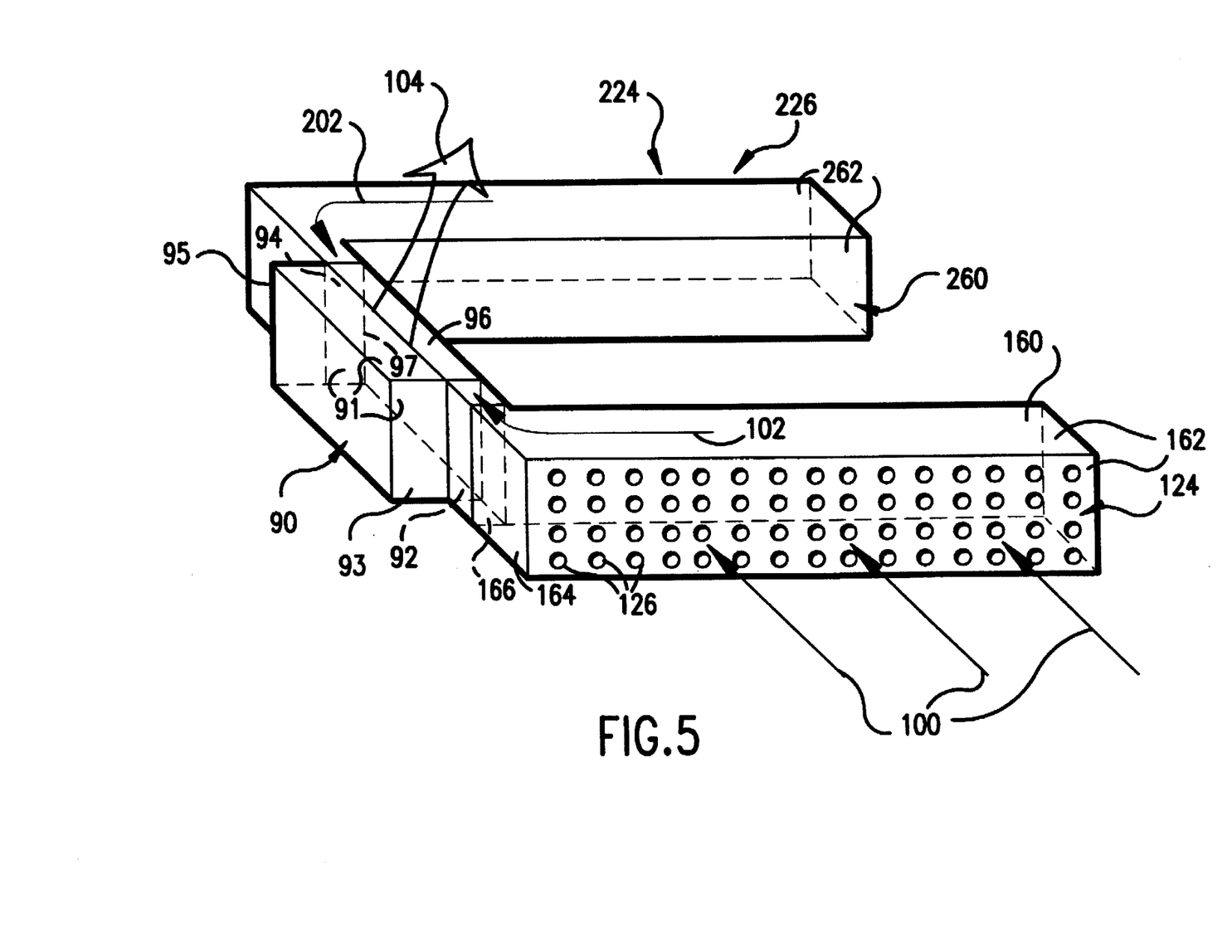
FIG. 5 is a schematic of the dust reduction system.
Figure 6:
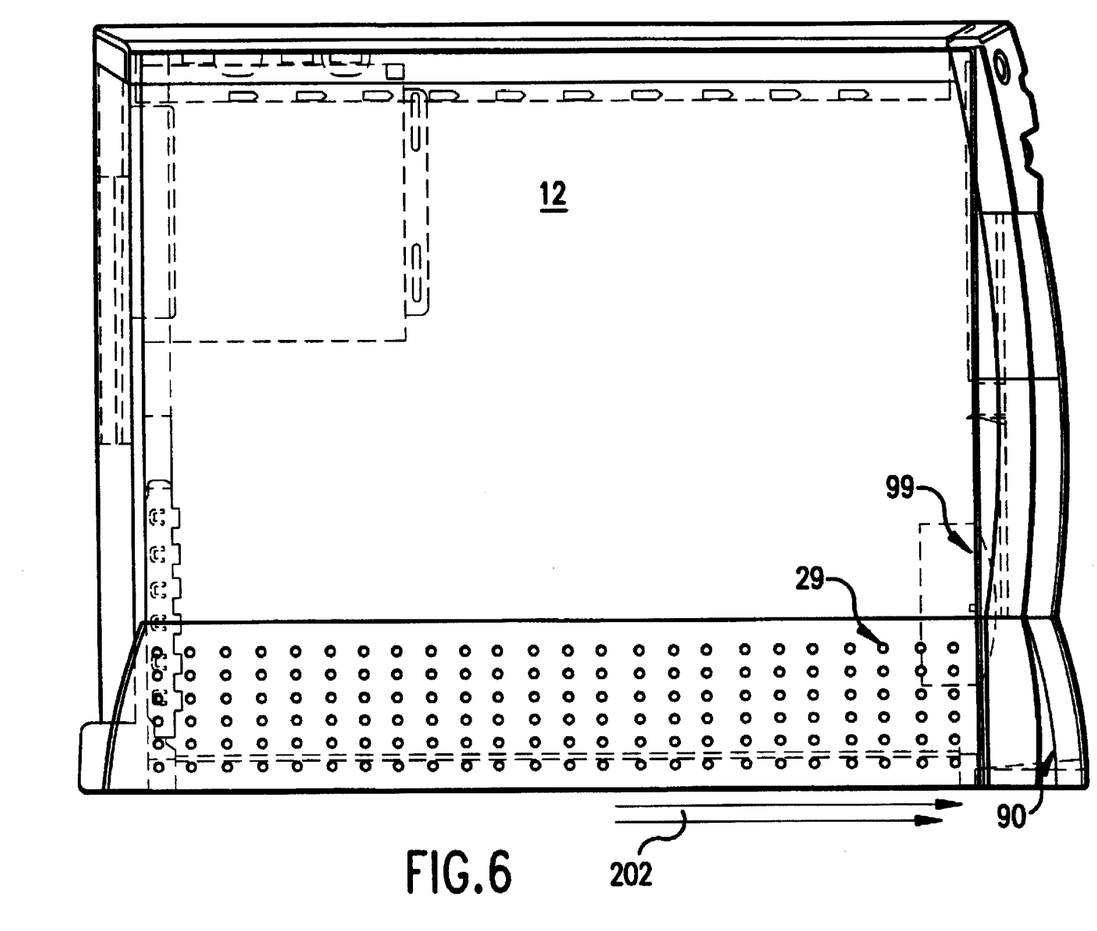
FIG. 6 is a side elevation view showing the direction of the ventilating air flow.
Figure 7:
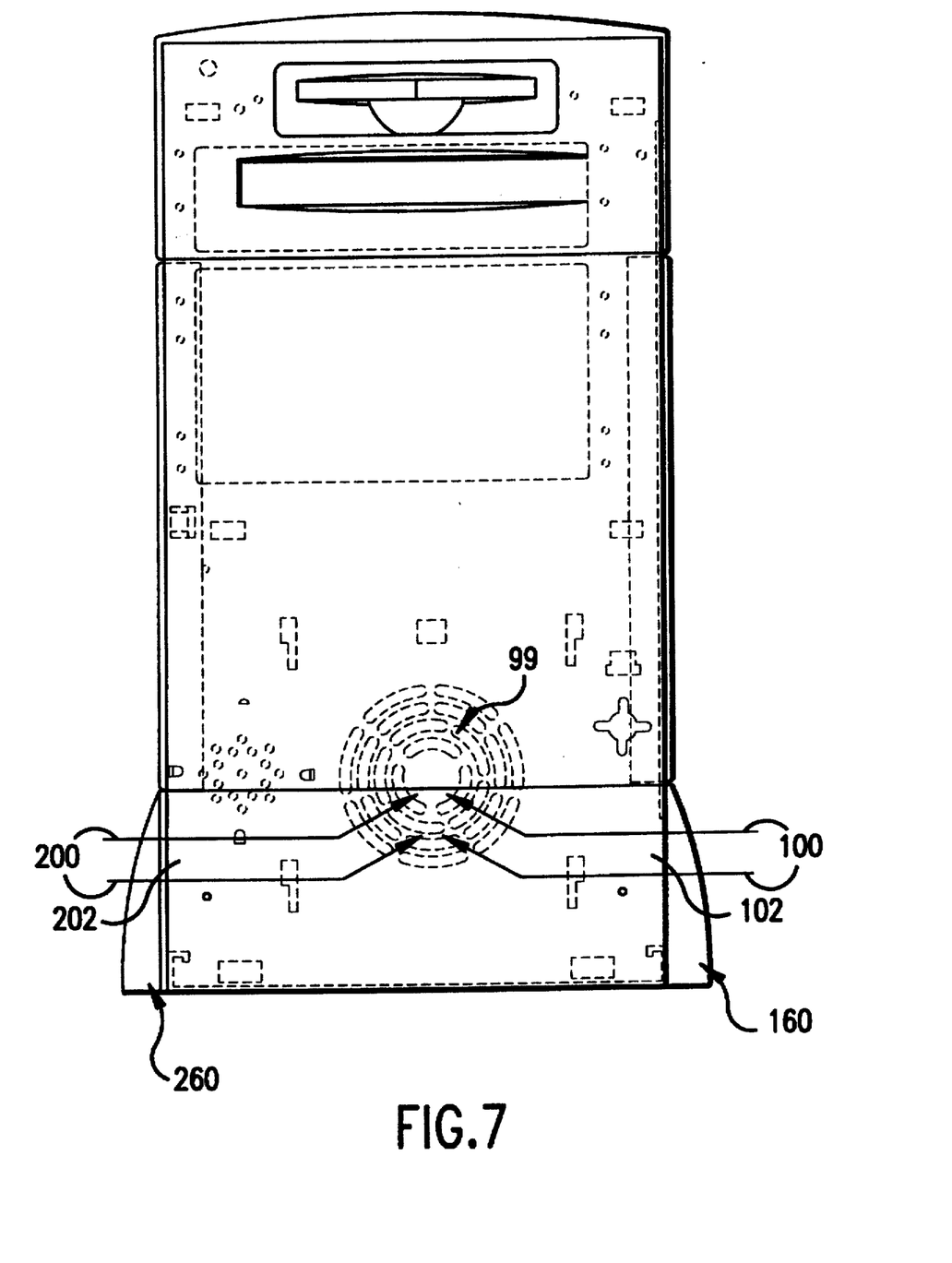
FIG. 7 is a front elevation view showing the direction of the ventilating air flow.

FIG. 5 is a schematic of the dust reduction system. FIGS. 6 and 7 show the direction of the ventilating air flow. Ventilating air 100 and 200 enters the enclosure 10 through the arrays of holes 126 and 226 in both side skirts 124 and 124. The holes 126 and 226 are sized small enough to prevent clumps of dust particles from entering enclosure 10. Side skirts 124 and 224 comprise one wall of expansion chambers 160 and 260, respectively. Expansion chamber 160, located adjacent to side skirts 124, has a plurality of walls 162 and a first end potion 164. Adjacent to first end portion 164 of expansion chamber 160 is a first opening 166 connected to plenum chamber 90. Similarly, expansion chamber 260, located adjacent to side skirt 224, has a plurality of walls 262 and a first end portion 264. Adjacent to first end portion 264 of expansion chamber 260 is a first opening 266 connected to plenum chamber 90. Thus, ventilating air 100 and 200 entering through arrays of holes 126 and 226, is directed into expansion chambers 160 and 260, respectively. Within expansion chambers 160 and 260, the velocity of the air decreases, allowing some of the dust particles to fall out of ventilating air streams 102 and 202. Ventilating air streams 102 and 202 then exit expansion chambers 160 and 260, through first expansion chamber openings 166 and 266, and is drawn into a plenum chamber 90 through plenum openings 92 and 94. In a preferred embodiment of the invention, plenum chamber 90 is located behind front skirts 36. Plenum chamber 90 has a plurality of walls 91, a first end portion 93, a second end portion 95, and an upper portion 97. Adjacent to first plenum end portion 93 of plenum chamber 90 is plenum opening 92 fluidly connected to expansion chamber 160 via expansion chamber first opening 166. Similarly, adjacent to second plenum end portion 95 of plenum chamber 90 is plenum opening 94 fluidly connected to expansion chamber 260 via expansion chamber first opening 266. A third opening 96 is located adjacent the upper portion 97 of plenum chamber 90, and is fluidly connected to central electronic component housing 12. Prior to ventilating air streams 102 and 202 entering plenum 90 at openings 92 and 94, the air streams 102 and 202 must first change direction. Essentially, ventilating air streams 102 and 202 are required to turn 90° in order to enter plenum 90 from expansion chambers 160 and 260. This change in air flow direction creates pockets of low velocity air or stagnation points, where dust particles will precipitate from ventilating air streams 102 and 202. Within plenum 90, the redirected and now opposing ventilating air streams 102 and 202 merge into a single central ventilating air stream 104, one ventilating air stream 102 emanating from expansion chamber 160 and entering through opening 92, and the other ventilating air stream 202 emanating from expansion chamber 260 and entering through opening 94. The head-on merging of the two oppositely disposed ventilating air streams 102 and 202 and the geometry of plenum 90 generates additional pockets of low velocity air further facilitating the removal of dust particles from the ventilating air. The single merged ventilating air stream 104 exits plenum 90 through opening 96 and is drawn by fan 99 into the central electronic component housing 12 of enclosure 10 where the electronic components are mounted. At this stage, the amount of dust particles in ventilating air stream 104 has been significantly decreased from the amount of dust particles in the original entering ventilating air streams 100 and 200, and fewer dust particles will impinge upon the electronic components.

The present invention is a series of five passive filtering regions. In the preferred mode of operation, ventilating air enters enclosure 10 through both side panels 120 and 220. However, even if one side panel were to become fully or partially blocked, the present invention guarantees that clean ventilating air would still be available to cool the electronic components. First, the arrays of small holes 126 and 226 stop the largest dust clumps from entering enclosure 10. Second, the expansion chambers 160 and 260 cause the air stream velocity to decrease allowing dust to precipitate out. Third, the air streams impinging on the ends of the expansion chambers prior to turning the corners to enter plenum chamber 90, producing low velocity vortices, and causing dust to leave the air streams. Fourth, the geometry of plenum chamber 90 and the merging of the ventilating air streams 102 and 202 create stagnation points wherein more dust falls out of the ventilating air. Fifth, the redirecting of the merged ventilating air stream 104 through plenum opening 94 and into the central electronic component housing 12 also creates low velocity vortices which further causes dust to leave the air stream.

In the preferred embodiment, the dust reduction system is integrated into an enclosure for a personal computer. This particular housing is designed to be placed on the floor in an upright position, i.e., the generally rectangular housing has its shortest dimension or edge parallel to the floor. Side skirts 124 and 224 compose the lower section of side panels 120 and 220, and flair out from the upper sections of the side panels 122 and 222. Arrays of holes 126 and 226 include 7 rows of through holes 29 with the rows parallel to the floor.

The disclosed embodiment is merely illustrative of the principles of the present invention, which could be implemented by variations in the structure which would be readily apparent to one skilled in the art. Accordingly, the scope of the present invention is to be determined in accordance with the appended claims.

What is claimed:

1. A dust reduction system for an electronic device, comprising:

an enclosure, said enclosure including a plurality of panels;

a first array of holes, said first array of holes located in a first panel;

a second array of holes, said second array of holes located in a second panel;

a first expansion chamber, said first expansion chamber, being located within said enclosure adjacent to said first array of holes, having one wall formed from said first panel and encompassing said first array of holes, and having a first end portion;

a second expansion chamber, said second expansion chamber, located within said enclosure adjacent to said second array of holes, having one wall formed from said second panel and encompassing said second array of holes, and having a first end portion;

a plenum chamber, said plenum chamber, having a first side opening, said first side opening in fluid communication with said first expansion chamber via said first end opening of said first expansion chamber, having a second side opening, said second side opening opposed to said first side opening and in fluid communication with said second expansion chamber via said first end opening of said second expansion chamber, having a third opening, said third opening in fluid communication with the region of said enclosure wherein the electronic components are housed;

said first array of holes, said first expansion chamber and said plenum chamber disposed in a travel path of a first ventilating air stream; and said second array of holes, said second expansion chamber and said plenum chamber disposed in a travel path of a second ventilating air stream.

2. The dust reduction system as claimed in 1, wherein said enclosure includes a first side panel, a second opposing side panel, a top panel, a bottom panel, a front panel and a back panel, said first array of holes is located in a lower section of said first side panel, and said second array of holes is located in a lower section of said second side panel.

3. The dust reduction system as claimed in 1, wherein said first expansion chamber forms a single volume, said second expansion chamber forms a single volume and said plenum chamber forms a single volume.

4. The dust reduction system as claimed in 2, wherein the electronic device is a personal computer having an enclosure that stands on the floor, said enclosure having a first relatively short horizontal dimension, a second horizontal dimension longer than said first horizontal dimension, and a vertical dimension longer than said first horizontal dimension, said array of holes extending from a first vertical edge to a second vertical edge and parallel to said second horizontal dimension.

* * * * *